US011230064B2

(12) United States Patent
Baumeister

(10) Patent No.: US 11,230,064 B2
(45) Date of Patent: Jan. 25, 2022

(54) INSPECTION OF A VERTICAL FLOW-WRAPPER

(71) Applicant: GEA Food Solutions Weert B.V., Weert (NL)

(72) Inventor: Bruno Baumeister, Aachen (DE)

(73) Assignee: GEA FOOD SOLUTIONS WEERT B.V., RV Weert (NL)

( * ) Notice: Subject to any disclaimer, the term of this patent is extended or adjusted under 35 U.S.C. 154(b) by 175 days.

(21) Appl. No.: 16/485,613

(22) PCT Filed: Feb. 12, 2018

(86) PCT No.: PCT/EP2018/053414
§ 371 (c)(1),
(2) Date: Aug. 13, 2019

(87) PCT Pub. No.: WO2018/158066
PCT Pub. Date: Sep. 7, 2018

(65) Prior Publication Data
US 2019/0389141 A1 Dec. 26, 2019

(30) Foreign Application Priority Data

Feb. 28, 2017 (EP) .................................. 17158408.9

(51) Int. Cl.
*B29C 65/02* (2006.01)
*B29C 65/00* (2006.01)
(Continued)

(52) U.S. Cl.
CPC ........ *B29C 65/02* (2013.01); *B29C 66/73921* (2013.01); *B29C 66/849* (2013.01);
(Continued)

(58) Field of Classification Search
CPC ....... B65B 57/005; B65B 59/04; B65B 61/24; B65B 65/02; B65B 51/30; B65B 51/26;
(Continued)

(56) References Cited

U.S. PATENT DOCUMENTS 4,517,790 A * 5/1985 Kreager .............. B29C 66/4312
53/552
4,655,862 A * 4/1987 Christoff ................. B29C 65/20
156/244.11
(Continued)

FOREIGN PATENT DOCUMENTS

CN 1646372 A 7/2005
EP 3047961 A1 7/2016
(Continued)

OTHER PUBLICATIONS

GEA Food Solutions SmartPacker CX360—video demonstration published Aug. 7, 2012. Retrieved from URL https://www.youtube.com/watch?v=HrtvWnMVI_0 on Mar. 31, 2021 (Year: 2012).*
(Continued)

*Primary Examiner* — Valentin Neacsu
(74) *Attorney, Agent, or Firm* — The Dobrusin Law Firm, P.C.

(57) ABSTRACT

A vertical flow-wrapper, for producing tubular bags from a foil web, with a frame/housing, at which a form-fill-tube, a longitudinal-sealing means and a cross-sealing means and a cutting means are provided. The vertical flow-wrapper includes a part of the frame/housing that is moveable relative to the frame/housing from an operation position into an inspection position and vice versa, and the cross-sealing means is provided on the part.

20 Claims, 2 Drawing Sheets

(51) Int. Cl.
  B65B 9/20 (2012.01)
  B65B 57/00 (2006.01)
  B65B 59/04 (2006.01)
  B65B 61/24 (2006.01)
  B65B 65/02 (2006.01)
  B29C 65/74 (2006.01)

(52) U.S. Cl.
  CPC .............. B29C 66/876 (2013.01); B65B 9/20 (2013.01); B65B 57/005 (2013.01); B65B 59/04 (2013.01); B65B 61/24 (2013.01); B65B 65/02 (2013.01); *B29C 65/74* (2013.01); *B29C 66/4312* (2013.01); *B29C 66/4322* (2013.01)

(58) Field of Classification Search
  CPC ..... B65B 51/28; B65B 51/303; B65B 51/306; B65B 51/146
  USPC .................................. 53/451, 550–552, 554
  See application file for complete search history.

(56) References Cited

U.S. PATENT DOCUMENTS

| | | | | | |
|---|---|---|---|---|---|
| 4,757,668 | A | * | 7/1988 | Klinkel | B29C 65/02 53/374.6 |
| 4,965,986 | A | * | 10/1990 | Klinkel | B65B 9/2028 53/389.5 |
| 5,014,493 | A | * | 5/1991 | West | B65B 9/2042 53/128.1 |
| 5,203,145 | A | * | 4/1993 | Kammler | B65B 9/207 53/552 |
| 5,634,324 | A | * | 6/1997 | Schmachtel | B31B 50/00 53/546 |
| 5,832,701 | A | * | 11/1998 | Hauers | B65B 9/213 53/551 |
| 6,032,437 | A | * | 3/2000 | Bois | B65B 9/20 493/213 |
| 6,634,158 | B1 | * | 10/2003 | Bois | B65B 9/20 53/551 |
| 6,711,875 | B2 | * | 3/2004 | Van Rens | B29C 65/18 53/133.4 |
| 6,761,016 | B1 | * | 7/2004 | Soleri | B65B 9/023 53/552 |
| 7,082,737 | B2 | * | 8/2006 | Van Rens | B29C 65/18 493/11 |
| 7,234,285 | B2 | * | 6/2007 | Kinigakis | B65B 9/20 53/133.4 |
| 8,689,850 | B2 | * | 4/2014 | Hull | B29C 66/43 156/580.2 |
| 9,061,783 | B2 | * | 6/2015 | Koenigkramer | B65B 9/2028 |
| 10,399,724 | B2 | * | 9/2019 | Aiello | B65B 41/18 |
| 2002/0088202 | A1 | * | 7/2002 | Van Rens | B65B 9/213 53/133.4 |
| 2003/0172626 | A1 | * | 9/2003 | Kohl | B65B 9/213 53/451 |
| 2004/0154271 | A1 | * | 8/2004 | Rietjens | B65B 9/2042 53/451 |
| 2010/0024363 | A1 | * | 2/2010 | Pape | B65B 61/28 53/459 |
| 2010/0032098 | A1 | * | 2/2010 | Lalli | B29C 66/91212 156/359 |
| 2010/0281832 | A1 | * | 11/2010 | Monti | B29C 66/83221 53/451 |
| 2012/0047849 | A1 | * | 3/2012 | Koenigkramer | B65B 9/207 53/416 |
| 2014/0109513 | A1 | * | 4/2014 | Van Rens | B29C 66/4312 53/285 |
| 2016/0297554 | A1 | * | 10/2016 | Hashimoto | B65B 9/20 |
| 2017/0253358 | A1 | * | 9/2017 | Kogure | B29C 66/8122 |
| 2017/0297754 | A1 | * | 10/2017 | Matheny | B29C 66/8167 |
| 2017/0297755 | A1 | * | 10/2017 | Matheny | B29C 66/8145 |
| 2017/0355477 | A1 | * | 12/2017 | Fontanazzi | B65B 61/24 |
| 2018/0057199 | A1 | * | 3/2018 | Aiello | B65B 9/20 |

FOREIGN PATENT DOCUMENTS

| | | |
|---|---|---|
| WO | 82/00986 A1 | 4/1982 |
| WO | 02/090187 A1 | 11/2002 |
| WO | 03089304 A1 | 10/2003 |

OTHER PUBLICATIONS

"4 Advantages of Side Gusset Pouches", by Eagle Flexible Packaging, published Mar. 23, 2017, retrieved from URL https://www.eagleflexible.com/about-US/blogs/4-advantages-of-side-gusset-pouches/ on Mar. 31, 2021 (Year: 2017).*
FIX—dictionary entry by Merriam Webster, retrieved from URL https://www.merriam-webster.com/dictionary/fix on Mar. 31, 2021 (Year: 2021).*
Dictionary definition of "PART", retrieved from URL https://www.merriam-webster.com/dictionary/part on Jul. 2, 2021 (Year: 2021).*
International Search Report and Written Opinion for International Application PCT/EP2018/053414; dated May 24, 2018.
Chinese First Office Action for Chinese patent application No. 2018800146308; dated Dec. 2, 2020.

* cited by examiner

INSPECTION OF A VERTICAL FLOW-WRAPPER

FIELD

The invention relates to improvements of a vertical flow-wrapper, for producing tubular bags from a foil web, with a frame/housing, at which a form-fill-tube, a longitudinal-sealing means and a cross-sealing means and a cutting means are provided.

BACKGROUND

A common method of making bags out of a foil web is the use of a vertical flow-wrapper. Such a packaging machine receives a continuous flat sheet, a foil of plastic material, e.g. a thermoplastic material, which is transported continuously or intermittently and passed downwardly over a form shoulder and is then shaped into a tubular form, i.e. into a foil tube, by being wrapped around a vertical form-fill tube of the packaging machine. After being wrapped around the vertical form-fill tube, the foil web is longitudinally closed by means of a longitudinally extending seal which is applied to the foil especially by heat sealing the lateral/longitudinal margins of the foil web or by heat sealing in the vicinity of these margins thereby joining them. This is carried out by so called longitudinal-sealing means. The foil tube has conventionally a rectangular, elliptical or a circular cross-sectional area. Conventionally, the foil tube is closed by cross-sealing means, preferably in a direction perpendicular to the direction of flow, i.e. transversely. Thereby, individual bags are defined out of the continuous foil tube. A product, such as a foodstuff, is introduced by dropping the product through a form-fill tube and into the foil tube surrounding the form-fill-tube. During filling, the foil tube is transversely open at its upper end, i.e. not cross-sealed. Thereafter and/or simultaneously, the foil tube together with the product is moved downwardly and then a top cross-seal is formed above the product and thereby a hermetically closed bag produced. As a last step or simultaneously to the application of the top seal, the bag is separated from the foil tube by cutting means. The known vertical flow-wrappers must be inspected and maintained regularly.

SUMMARY

The basic purpose of the invention is therefore to provide a vertical flow-wrapper, which can be maintained easily, whereby the vertical flow-wrapper is more cost-effectively built and/or includes an increased space effectiveness.

The purpose is attained by providing a vertical flow-wrapper with a frame/housing, at which a form-fill tube, a longitudinal-sealing means and a cross-sealing means and a cutting means are provided, wherein the cross-sealing means is provided at a part which is moveable relative to the frame/housing from an operation—into an inspection position and vice versa. The present invention relates to a vertical flow-wrapper with a frame and/or a housing, which receives a continuous flat sheet, a foil of plastic material, e.g. a thermoplastic material, which is transported continuously or intermittently and passed downwardly over a form shoulder and then shaped into a tubular form, i.e. into a foil tube, by being wrapped around a vertical form-fill tube of the packaging machine. After being wrapped around the vertical form-fill tube, the foil web is longitudinally closed by means of a longitudinally extending seal which is applied to the foil especially by heat sealing the lateral/longitudinal margins of the foil web or by heat sealing in the vicinity of these margins thereby joining them. This is carried out by so called longitudinal-sealing means. The foil tube has conventionally a rectangular, elliptical or a circular cross-sectional area. Conventionally, the foil tube is closed by cross-sealing means, preferably in a direction perpendicular to the direction of flow, i.e. transversely. Thereby, individual bags are defined out of the continuous foil tube. A product, such as a foodstuff, is introduced into the foil tube by dropping the product through a form-fill tube and into the foil tube surrounding the form-fill tube. During filling the foil tube is transversely open at its upper end, i.e. not cross-sealed. Thereafter and/or simultaneously, the foil tube together with its product is moved downwardly and then a top cross-seal is formed above the product and thereby the hermetically closed bag produced. As a last step or simultaneously to the application of the top seal, the bag is separated from the foil tube by cutting means.

According to the present invention the cross-sealing means, and/or the cutting means is provided at a part, which is moveable relative to the frame/housing from an operation—into an inspection position and vice versa. Each sealing means comprises a heated part, e.g. a jaw or a roll, a drive, which moves the heated part and/or a mechanics, e.g. a gear, between the drive and the heated part. The sealing means may comprise a drive and/or a gear, which move the sealing means entirely. This is particularly needed in case the web is transported continuously. The above mentioned movable part is preferably part of the housing of the vertical flow-wrapper, more preferably a plate, even more preferably a sheet metal-plate that more preferably comprises stiffening means like a frame.

In the operation position, the part is in a clearly defined and fixed position relative to the frame, so that the cross-seal and/or the cut are provided at a desired position of the foil-tube, for example relative to a print-mark on the foil and/or relative to the form-fill-tube, preferably its lower end. Additionally, or alternatively, in the operation position, the part, at which the sealing means, preferably the cross-sealing means, and/or the cutting means is provided, is provided at the frame/housing with a bearing and/or lock, that transfer(s) all forces and moment of momentums from the sealing means and/or cutting means and/or their respective drives into the frame/housing of the vertical flow-wrapper. The cross-sealing- and/or cutting-means can move in one, two or more directions relative to the part. The sealing jaw and its drive are preferably provided at two opposing, parallel sides of the part. Preferably, a fixation construction for the sealing means is provided at the part.

Preferably, the part is pivoted relative to the frame/housing of the vertical flow-wrapper. In this case, the part, preferably a plate, is connected to the frame/housing by one or more hinge(s). For inspection purposes, the part is pivoted from an operation—into an inspection position, in which particularly the drive of the sealing- and/or cutting means and/or the electrical connection of the sealing means, particularly their heating means and/or sensors can be inspected.

According to another preferred embodiment, the part is alternatively or additionally moved linearly relative to the frame/housing from an operation—into an inspection position. For the linear movement, the inventive flow-wrapper, preferably its frame/housing, comprises guiding means, such as rails, a connecting rod, a slotted link or the like, which guide and bear the part during its transition from the operation- to the inspection position.

Preferably, the part and/or the frame/housing comprises means to fix the part relative to the housing in the operating position, so that its position relative to the frame is clearly defined and fixed and all loads which act on the part are transferred into the frame/housing. Preferably, the means can be loosened and fixed without a tool, preferably by an automated drive, preferably a motor.

Preferably, the sealing jaws/rolls are provided on one side of the part and its drive on the opposite side. During operation, only the sealing jaw/roll and/or the cutting means are visible, while the drive and/or the electrical connection and/or mechanical parts between the drive and the sealing- and/or cutting-means, such as gears or the like, are not visible and/or protected against debris and/or dirt.

According to another preferred embodiment, the vertical flow-wrapper comprises gusset-forming means, which is provided at the movable part. The gussets are preferably formed in the vicinity of the upper and the lower end of each bag and prior to providing the cross-seal. Preferably, the vertical flow-wrapper comprises safety means, which blocks start-up of the wrapper, in case the movable part is not fixedly secured to the frame/housing. This means can be for example a sensor and a control system. The sensor detects the position of the part relative to the frame/housing and based on the signal, a start-up of the flow-wrapper is either allowed or denied. Additionally, or alternatively, the loosening of the fixation means of the movable part is only allowed in case the vertical flow-wrapper is turned off. This relationship can also be controlled by a control system. As long as the vertical flow-wrapper is not turned off, the loosening of the movable part is blocked.

Another subject matter of the present application is a method to inspect the drive, the electrical supply and/or the connection to a sensor of the sealing means of the inventive vertical flow-wrapper, wherein the fixation of the movable part at the frame/housing is loosened and the movable part together with the sealing means is moved from an operation- into an inspection-position.

The disclosure regarding this embodiment of the present invention also apply to the inventive vertical flow-wrapper and vice versa. Subject matters form this embodiment can be combined with the inventive flow-wrapper and vice versa.

This embodiment of the present invention relates to a method to inspect and/or maintain the drive, the electrical supply and/or the connection to a sensor of the sealing means of a vertical flow wrapper. For this inspection or maintenance, a fixation of a movable part which is connected to the housing is loosened and this part, at which the sealing means and/or the cutting means and their respective drives are provided, is moved from an operation—into an inspection-position. In this inspection position, the drive, the electrical supply and/or the connection to a sensor of the sealing means can be inspected and maintained. In the operation position, these parts of the vertical flow-wrapper are hidden by the housing and hence protected against environmental influences.

Preferably, the means to fix the part relative to the frame is loosened after the flow wrapper has been switched to a non-operation mode. Preferably, the vertical flow-wrapper can only be started-up after the moveable part is fixed to the frame/housing of the vertical flow-wrapper. This avoids damages to the part and/or the sealing means or their drive.

BRIEF DESCRIPTION OF THE FIGURES

The invention is disclosed referring to the figures of the attached drawings, by way of non-limiting examples.

DETAILED DESCRIPTION

Figure 1:
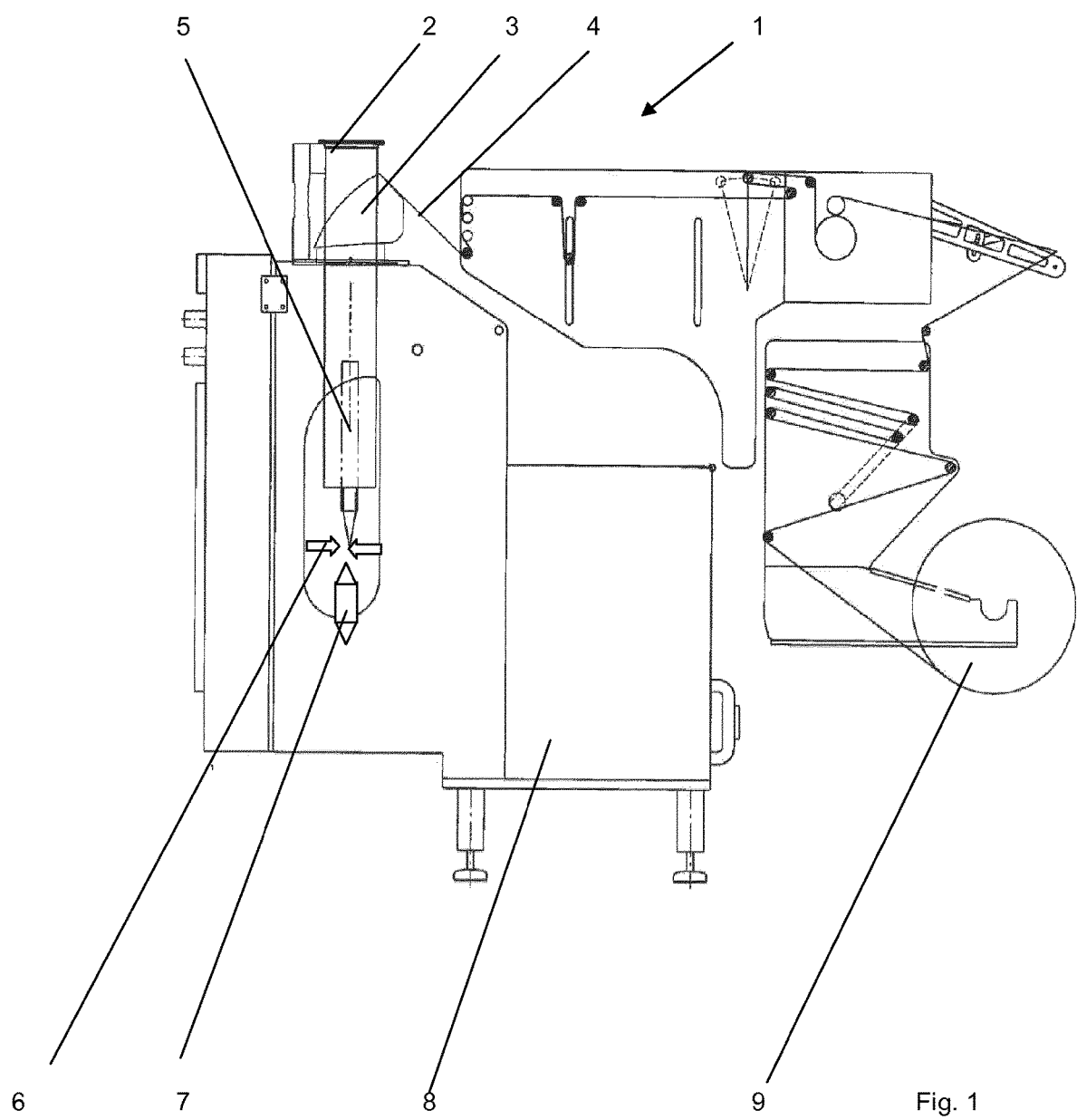
FIG. 1 shows schematically the vertical flow-wrapper according to the invention.

In FIG. 1, the vertical flow-wrapper 1 according to the invention is schematically shown. A vertical flow wrapper is a packaging machine, which forms a plane foil web into a foil tube, which is transported along a form-fill tube. Two ends of this foil tube are sealed together by a longitudinal sealing means. Subsequently, the packaging item is filled into the foil tube and a cross-seal is applied to the foil tube to close the package. Simultaneously or after applying the cross-seal, the finalized packages are cut off the foil tube. The vertical flow wrapper comprises a frame/housing 8, at which a form shoulder 3, a form-fill tube 2 and longitudinal sealing means 5 and cross-sealing means 6 are provided. The vertical flow-wrapper may comprise gusset forming means to form the bottom and/or the top of each bag.

A web of a foil 4, especially a weldable plastic foil 4, is supplied from a reel, which supplies the plane foil continuously or intermittently to a form shoulder 3, which shapes the foil web into a rather tubular form around a form-fill tube 2. In the context of the present invention, a "tubular form" of the bags or of the foil means any cross-sectional form including a circular form or another form, and especially a rectangular or generally a polygonal form. Longitudinal sealing means 5, which are provided downstream from the form shoulder, seal the edges to the foil tube together. After sealing, the bottom of the bag 7 can be formed by a special bottom forming means, for example gusset-forming means. Finally, cross seals, extending preferably perpendicularly to the direction of flow of the foil, are applied, especially by means of cross-sealing means 6. These cross sealing means 6 apply to the bag 7 not only a cross-seal closing the top of the bag 7, but these cross-sealing means 6 advantageously also provide, preferably simultaneously a cross-seal defining the bottom of the subsequent, upstream bag 7. The bags 7 produced are separated from one another by a cutting means, which are preferably incorporated into the cross-sealing means 6. Between the application of the bottom- and top-cross-seal of each bag, the bag is filled with the product, preferably an edible product.

Figure 2A:
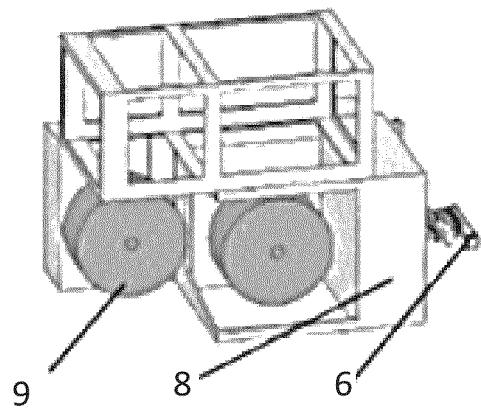
FIGS. 2a and 2b show the inventive vertical flow wrapper with the part in the operating position
Figure 2B:
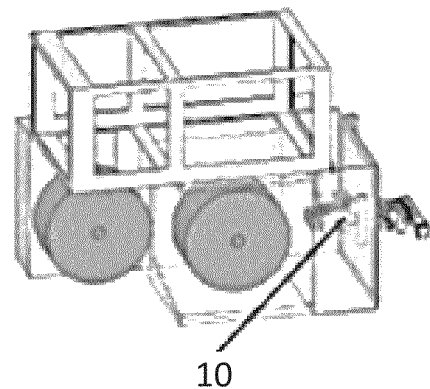
Figure 3:
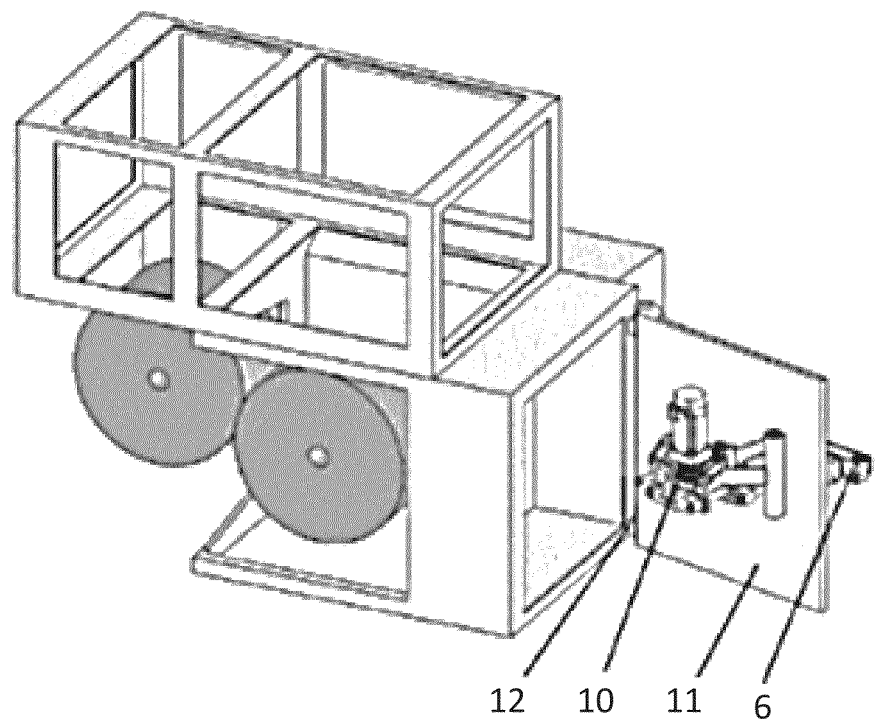
FIG. 3 shows the inventive vertical flow wrapper with the part in the inspection position

As already mentioned above, the inventive vertical flow wrapper comprises a frame/housing 8, at which all components of the vertical flow wrapper are provided, particularly the longitudinal- and cross-sealing mean 5, 6, the cutting means and if needed the gusset-forming means. Reference is made to FIGS. 2a and 2b, which depict, that the cross-sealing means 6 are provided outside of the frame/housing 8 of the vertical flow wrapper, while its drive 10 and its electrical connection and/or at least parts of the gear between the sealing jaws and the drive are provided inside of the frame/housing, i.e. protected by the frame/housing 8. Further, according to the invention, the longitudinal- and cross-sealing mean 5, 6 and/or its drive 10 are provided at a part 11 of the frame/housing that is movable relative to the rest of the frame/housing from an operation- to an inspection-position. While FIGS. 2a and b depict the operating position, FIG. 3 depicts the inspection position. In the present case, the part 11 is hinged to the frame/housing and hence pivotable relative to the housing by means of, here two, hinges 12. However, the person skilled in the art understands, that the part 11 can also or additionally be moved linearly from the operating- to the inspection-position and vice versa. In the inspection position, the drive 10, the electrical connection and/or part of the mechanics related to the sealing means 5, 6 can be inspected and/or maintained. In the operating position, however, the part 11 is fixed such to the frame, that all loads, from the sealing means 5, 6 and/or their respective drives 10 are transferred into the frame/housing and that the part 11 is in a well-defined, fixed and reproducible position relative to the frame. The part 10 is preferably designed such that it is relatively stiff, so that it does not deform during operation.

LIST OF REFERENCE SIGNS 1 vertical flow-wrapper
2 form-fill tube
3 form shoulder
4 foil, film
5 longitudinal-sealing means
6 cross-sealing- and/or cutting means
7 package
8 frame/housing
9 reel
10 drive for the cross-sealing- and/or cutting-means
11 movable part of the frame/housing
12 hinge

The invention claimed is:

1. A vertical flow-wrapper comprising:
a frame/housing, at which: a form-fill-tube, a longitudinal-sealing means, a cross-sealing means, and a cutting means are provided, and
a part of the frame/housing, which is moveable relative to the frame/housing from an operation position into an inspection position and vice versa,
wherein the cross-sealing means is provided on a first surface of the part and a drive of the cross-sealing means is provided on a second surface of the part, and during the movement of the part between the operation position and the inspection position, both of the cross sealing means and the drive are moved together with the part and away from the frame/housing.

2. The vertical flow-wrapper according to claim 1, wherein the part is configured to be pivoted and/or moved linearly relative to the frame/housing.

3. The vertical flow-wrapper according to claim 1, wherein the part and/or the frame/housing comprises means to fix the part relative to the frame/housing.

4. The vertical flow-wrapper according to claim 1, further comprising gusset-forming means, which is provided at the part.

5. The vertical flow-wrapper according to claim 1, further comprising safety means that is configured to block start-up of the vertical flow-wrapper, in case the part is not fixedly secured to the frame/housing.

6. The vertical flow-wrapper according to claim 1, wherein the part is a plate connected to the frame/housing by one or more hinges.

7. The vertical flow-wrapper according to claim 1, wherein the part and/or the frame/housing comprises means to fix the part relative to the frame/housing so that loads that act on the part are transferred into the frame/housing.

8. The vertical flow-wrapper according to claim 7, wherein the means to fix the part relative to the frame/housing is configured to be loosened and fixed by an automated drive.

9. The vertical flow-wrapper according to claim 8, wherein the automated drive is a motor.

10. The vertical flow-wrapper according to claim 1, wherein the vertical flow-wrapper comprises a safety means that is configured to block start-up of the vertical flow-wrapper if the part is not fixedly secured to the frame/housing, the safety means is a sensor, the sensor is configured to detect a position of the part relative to the frame/housing.

11. The vertical flow-wrapper according to claim 1, wherein the part is a lid to a box structure.

12. The vertical flow-wrapper according to claim 11, wherein in the in-operation position, the drive is concealed from view within the box structure.

13. The vertical flow-wrapper according to claim 1, wherein the part pivots about an axis that is generally perpendicular to a rotational axis of a reel comprising a plastic foil.

14. The vertical flow-wrapper according to claim 1, wherein in the operation position, the drive is not visible from outside of the frame/housing.

15. The vertical flow-wrapper according to claim 1, wherein the part is a plate, and sealing jaws/rolls are provided on one side of the plate, and the drive is provided on an opposite side of the plate, the plate is a lid or door, the part pivots about an axis that is generally perpendicular to a rotational axis of a reel comprising a plastic foil.

16. The vertical flow-wrapper according to claim 1, wherein the vertical flow-wrapper comprises a control system that is configured to allow loosening of the part when the vertical flow-wrapper is turned off.

17. The vertical flow-wrapper according to claim 1, wherein during the movement, a position of the drive relative to the cross sealing means remains the same.

18. The vertical flow-wrapper according to claim 1, wherein during the movement, a position of the drive relative to the part remains the same.

19. A method to inspect a drive, an electrical supply, and/or a connection to a sensor of the longitudinal-sealing means and/or the cross-sealing means of the vertical flow-wrapper according to claim 1, wherein a means to fix the part at the frame/housing is loosened and the part together with the cross-sealing means is moved from the operation position into the inspection position.

20. The method according to claim 19, wherein the means to fix the part relative to the frame/housing is loosened after the vertical flow-wrapper has been switched to a non-operation mode.

* * * * *